United States Patent [19]

Bushnell et al.

[11] Patent Number: 5,447,733
[45] Date of Patent: Sep. 5, 1995

[54] PREVENTION OF ELECTROCHEMICAL AND ELECTROPHORETIC EFFECTS IN HIGH-STRENGTH-ELECTRIC-FIELD PUMPABLE-FOOD-PRODUCT TREATMENT SYSTEMS

[75] Inventors: Andrew H. Bushnell, San Diego; Reginald W. Clark, Del Mar; Joseph E. Dunn, Vista; Samuel W. Lloyd, La Mesa, all of Calif.

[73] Assignee: PurePulse Technologies, Inc., San Diego, Calif.

[21] Appl. No.: 354,233

[22] Filed: Dec. 8, 1994

Related U.S. Application Data

[63] Continuation-in-part of Ser. No. 178,745, Jan. 6, 1994, Pat. No. 5,393,541.

[51] Int. Cl.[6] ............................................. A23L 3/32
[52] U.S. Cl. ........................................ 426/237; 99/451; 99/483; 99/DIG. 14; 426/521
[58] Field of Search ............... 99/451, 483, DIG. 14, 99/516, 536; 422/22, 23; 426/237, 238, 521; 219/291, 295, 288

[56] References Cited

U.S. PATENT DOCUMENTS

| | | | |
|---|---|---|---|
| 1,900,509 | 3/1933 | Louder | 426/237 |
| 2,428,328 | 9/1947 | Ham et al. | 422/22 |
| 2,428,329 | 9/1947 | Ham et al. | 422/22 |
| 2,907,887 | 10/1959 | Beck | 250/214 R |
| 3,594,115 | 7/1971 | Wesley et al. | 422/22 |
| 4,457,221 | 7/1984 | Geren | 99/451 |
| 4,458,153 | 7/1984 | Wesley | 250/435 |
| 4,524,079 | 6/1985 | Hofmann | 426/234 |
| 4,695,472 | 9/1987 | Dunn et al. | 426/237 |
| 4,838,154 | 6/1989 | Dunn et al. | 99/483 |
| 4,994,160 | 2/1991 | Doevenspeck | 204/165 |
| 5,048,404 | 9/1991 | Bushnell et al. | 99/DIG. 14 |
| 5,235,905 | 8/1993 | Bushnell et al. | 99/451 |

FOREIGN PATENT DOCUMENTS 1946267 1/1976 Germany .
2907887 9/1980 Germany .

*Primary Examiner*—Timothy F. Simone
*Attorney, Agent, or Firm*—Fitch, Even, Tabin & Flannery

[57] ABSTRACT

Microorganisms are deactivated in a food product using an electrode placed into electrical contact with the food product. A current signal is applied to the electrode during a specified time period, causing a deactivating charge to build up on the first electrode. An electrical field results from the deactivating charge having an electric field strength of at least 5,000 volts/cm. Substantially all of a residual charge is removed from the first electrode during a discharge period, such that an approximately zero net charge is delivered to the first electrode following the discharge period, thereby reducing electrophoretic side-effects. The current signal causes an electrical double layer at the electrode to charge to a prescribed voltage. One embodiment, the prescribed voltage does not exceed a reaction voltage of a prescribed reacting material species for more than a prescribed threshold period, thereby reducing electrochemical reactions within the food product.

48 Claims, 5 Drawing Sheets

PREVENTION OF ELECTROCHEMICAL AND ELECTROPHORETIC EFFECTS IN HIGH-STRENGTH-ELECTRIC-FIELD PUMPABLE-FOOD-PRODUCT TREATMENT SYSTEMS

This patent document is a continuation-in-part of application Ser. No. 08/178,745, filed Jan. 6, 1994, now U.S. Pat. No. 5,393,541, commonly assigned with the present invention.

BACKGROUND OF THE INVENTION

The present invention relates to processing of pumpable food products, and more particularly to processing systems and methods for deactivating organisms in pumpable food products or foodstuffs, which systems and methods extend the shelf life of such food products or foodstuffs. Even more particularly, the present invention relates to the prevention or reduction of electrode fouling and/or prevention or reduction of electrochemical reactions in very high strength electric field systems for deactivating organisms in pumpable food products.

As used herein the phrases "deactivating organisms, "deactivate organisms," "deactivation of organisms" and similar phrases refer to the killing or sterilization of living organisms such as bacteria, viruses, fungi, protozoa, parasites and the like.

Substantial technical effort has been directed to the preservation of perishable fluid food products such as milk products, natural fruit juices, liquid egg products, and pumpable meat products, such as ground beef or turkey. Such liquid food products may normally contain a wide variety of microorganisms, and are excellent culture media for such microorganisms.

Practical preservation methods which have found significant commercial application predominantly utilize heat treatment such as pasteurization to inactivate or reduce the microorganism population. For example, milk products are conventionally pasteurized at a minimum temperature of at least about 72° C. for 15 seconds (or equivalent time/temperature relationship) to destroy pathogenic bacteria and most of the nonpathogenic organisms, with degradative enzyme systems also being partially or totally inactivated. However, products processed in this manner are still generally unsterile and have limited shelf life, even at refrigeration temperature. The shelf life of liquid foodstuffs may be substantially extended by higher heat treatment processes such as "ultra high pasteurization", or "ultra high temperature" ("UHT") treatment, at a temperature of 140° C. for four seconds. These processes are used in conjunction with aseptic packaging to achieve complete destruction of all bacteria and spores within the food product, however, such heat treatment typically adversely affects the flavor of the food product, at least partially denatures its protein content or otherwise adversely affects desired properties of the fluid food product. Other approaches to liquid food preservation, which also have certain disadvantages, include the use of chemical additives or ionizing radiation.

The bactericidal effects of electric currents have also been investigated since the end of the 19th century, with various efforts having been made to utilize electrical currents for treating food products. Such efforts are described in U.S. Pat. Nos. 1,900,509, 2,428,328, 2,428,329 and 4,457,221 and German Patents 1,946,267 and 2,907,887, inter alia, all of which are incorporated herein by reference. The lethal effects of low-frequency alternating current with low electric field strength have been largely attributed to the formation of electrolytic chemical products from the application of current through direct contact electrodes, as well as ohmic heating produced by current flow through an electrically resistive medium. Unfortunately however, the electrolytic chemical products generated by low frequency, low strength electric field methods may be undesirable in fluid foodstuffs, and heating, as noted above, may also cause undesirable effects in the fluid foodstuffs.

As described in U.S. Pat. No. 3,594,115, incorporated herein by reference, lethal effects of high voltage arc discharges have also been attributed to electrohydraulic shock waves. The utilization of explosive arc discharges to produce microbiologically lethal shock waves has not found wide-spread application as it is not a very effective means for preserving edible liquid foodstuffs. In addition, such explosive arc discharges can produce undesirable chemical byproducts in the foodstuffs being treated.

More recently, the effect of strong electric fields (or very high strength electric fields) on microorganisms has been studied as a mechanism for reversibly or irreversibly increasing the permeability of the cell membrane of microorganisms and individual cells. The application of very high strength electric fields to reversibly increase the permeability of cells has been used to carry out cell fusion of living cells and to introduce normally excluded components into living cells. Very high strength electric fields in nonnutrient media can also have a direct irreversible lethal effect upon microorganisms with the rate of deactivation dependent upon the field strength above a critical field level and the duration of the applied very high strength electric field.

A pulsed field treatment apparatus, which uses very high strength electric field pulses of very short duration, to deactivate microorganisms in food products is shown in U.S. Pat. Nos. 5,235,905 (the '905 patent); and 5,048,404 (the '404 Patent), issued to Bushnell et al., and U.S. Pat. Nos. 4,838,154 (the '154 patent); and 4,695,472 (the '472 patent), issued to Dunn et al., all of which are incorporated herein by reference. Generally, in accordance with the these patents, methods and apparatuses are provided for preserving fluid foodstuffs (or pumpable foodstuffs), which are normally excellent bacteriological growth media. Such preservation is achieved by applying very high strength electric field pulses (of at least 5000 v/cm) of very short duration (of no more than about 100 microseconds) through all of the pumpable foodstuff.

By "pumpable," "liquid," or "fluid" "food product" or "foodstuff" is meant an edible, food product having a viscosity or extrusion capacity such that the food product may be forced to flow through a treatment zone, e.g., less than about 1000 poise. The products include extrudable products, such as doughs or meat emulsions such as hamburger; fluid products such as beverages, gravies, sauces, soups, and fluid dairy products such as milk; food-particulate containing food slurries such as stews; food-particulate containing soups, and cooked or uncooked vegetable or grain slurries; and gelatinous foods such as eggs and gelatins.

By "bacteriological growth medium" is meant that upon storage at a temperature in the range of 0° C. to about 30° C., the fluid foodstuff, with its indigenous microbiological population or when seeded with test organisms, will demonstrate an increase in biological content or activity as a function of time as detectable by direct microscopic counts, colony forming units on appropriate secondary media, metabolic end product analyses, biological dry or wet weight or other qualitative or quantitative analytical methodology for monitoring increase in biological activity or content. For example, under such conditions the microbiological population of a pumpable foodstuff which is a bacteriological growth medium may at least double over a time period of two days.

The compositions of typical fluid food products which are biological growth media, derived from "Nutritive Value of American Foods in Common Units", Agriculture Handbook No. 456 of the U.S. Department of Agriculture (1975), are as follows:

| Fluid Food Product | FLUID FOODSTUFFS | | | | | |
|---|---|---|---|---|---|---|
| | Water Wt % | Protein Wt % | Fat Wt % | Carbohydrate Wt % | Na Wt % | K Wt % |
| Whole Milk (3.5% fat) | 87.4 | 3.48 | 3.48 | 4.91 | .05 | .144 |
| Yogurt** | 89.0 | 3.40 | 1.68 | 5.22 | .050 | .142 |
| Raw Orange Juice | 88.3 | .685 | .20 | 10.0 | .0008 | .2 |
| Grape Juice | 82.9 | .001 | tr. | .166 | .0019 | .115 |
| Raw Lemon Juice | 91.0 | .41 | .20 | 8.0 | .0008 | .14 |
| Raw Grapefruit Juice | 90.0 | .48 | .08 | 9.18 | .0008 | .16 |
| Apple Juice | 87.8 | .08 | tr. | 11.9 | .0008 | .10 |
| Raw Whole Eggs | 73.7 | 12.88 | 11.50 | .90 | .12 | .13 |
| Fresh Egg Whites | 87.6 | 10.88 | .02 | .79 | .15 | .14 |
| Split Pea Soup* | 70.7 | 6.99 | 2.60 | 16.99 | .77 | .22 |
| Tomato Soup* | 81.0 | 1.60 | 2.10 | 12.69 | .79 | .187 |
| Tomato Catsup | 68.6 | 2.0 | .588 | 25.4 | 1.04 | .362 |
| Vegetable beef soup | 91.9 | 2.08 | .898 | 3.9 | .427 | .066 |

*condensed-commercial
**from partially skimmed milk

Very high strength electric fields may be applied by means of treatment cells of high-field-strength design, examples of which are described in detail by Bushnell et al. and Dunn et al. Basically, the foodstuff is, in practice, electrically interposed between a first electrode, and a second electrode. The very high strength electric field is generated between the first and second electrodes such that the very high strength electric field passes through the foodstuff, subjecting any microorganisms therein to the very high strength electric field. Generally, the second electrode consists of a grounded electrode, and a relatively higher or lower voltage potential is applied to the first electrode.

In the Bushnell et al. patents and the Dunn et al. patent, the pumpable fluid foodstuff is subjected to at least one very high strength electric field and current density electrical pulse, and at least a portion of the fluid foodstuff is subjected to a plurality of very high strength electric field and current density pulses, in a high-strength electric pulse treatment zone. In one processing technique, the liquid foodstuff is introduced into a treatment zone, or cell, between two electrodes which have a configuration adapted to produce a substantially uniform electric field thereinbetween without dielectric tracking or other breakdown. Very high strength electric field pulses are applied to the electrodes to subject the liquid foodstuff to multiple pulse treatment by the pulsed field apparatus. In order to generate the very high strength electric field pulses, the pulsed field apparatus employs, for example, a lumped transmission line circuit, a Blumlein transmission circuit and/or a capacitive discharge circuit. Alternatively, the Bushnell et al. patents describe the use of field reversal techniques in capacitive discharge systems (or pulse forming networks) to increase the effective potential across the treatment cell. For example, by applying a short electric field pulse of very high electric field strength (e.g., 20,000 volts per centimeter) across a treatment cell for a short period of time (e.g., 2 microseconds) of one polarity, followed by abrupt reversal of the applied potential within a short time period (e.g., 2 microseconds), an effective field approaching 40 kilovolts per centimeter is achieved across the cell.

If liquid foodstuff (i.e., pumpable foodstuff) is continuously introduced into the treatment zone to which very high strength electric field pulses are periodically applied, and fluid foodstuff is concomitantly withdrawn from the treatment zone, the rate of passage of the liquid foodstuff through the treatment zone can be coordinated with the pulse treatment rate so that all of the pumpable foodstuff is subjected to at least one very high strength electric field pulse within the treatment zone. The liquid foodstuff may be subjected to treatment in a sequential plurality of such treatment zones, or cells, as is described in more detail by Bushnell et al.

Problematically, in processing some food products, such as milk or rich protein solutions, using the apparatuses and/or methods described by Bushnell et al., and Dunn et al., or the like, a film of materials can collect, or agglomerate, on the first and/or second electrode. This film of materials can consist of proteins and/or other materials (referred to herein as a fouling agent or polluting agent) that are present in the milk, or other protein rich materials. The formation of the film, or fouling of the electrode(s), is an undesirable side-effect that is believed to be due to the electrophoretic concentration of charged molecules within a boundary layer of food product that is adjacent to the treatment electrode. It has been noted that, for example, when the food product consists of raw milk, the fouling occurs only on the anode (i.e., the electrode to which electrons flow); the cathode (i.e., the electrode from which electrons flow) remains relatively free of any film buildup or agglomeration. Unfortunately, this agglomeration of the fouling agent on the electrode(s) during extended processing periods can cause electrical breakdown in the cell, fouling or contamination of the system, and in some cases can even cause the flow of fluid food product to stop. For some products, significant fouling of the electrode (or electrodes) can occur after only a few minutes of system operating time. For other products the time before which the fouling of the electrode (or electrodes) becomes significant can be a few hours or longer.

One attempt to solve a similar problem—electrolysis—is shown in the Dunn et al. patents. In accordance with the teachings of these patents, the suggestion is made that the first and second electrodes can be constructed so as to prevent direct electrolysis of the fluid foodstuff upon application of a pulsed electric field thereto. That is, the electrodes may each employ an electrically conductive electrolysis electrode, an ion permeable membrane and an intermediate electrolyte, such that ionic electrical connection is made with the fluid foodstuff through the ion permeable membrane rather than by direct contact with the electrically conductive electrode. Problematically, however, such electrolysis electrodes do not address the problem of electrophoresis, and they require the use of costly and cumbersome additional components in the pulsed field treatment apparatus. Thus what is needed is a way to prevent electrophoretic agglomeration of the fouling agent on the electrodes.

The problem of electrolysis, also, cannot be overlooked. Electrolysis occurring at the electrodes within a food product poses a further problem: that of electrochemical effects in the food product. These electrochemical effects are undesirable side-effects that can cause chemical byproducts to form within the food product at the electrodes and/or cause other undesirable effects within the food product. The use of ion permeable membranes, as shown by Dunn et al., offers one possible solution to this problem, but requires the addition of the ion permeable membranes surrounding the electrodes, which increases cost, and complicates the design of the electrodes. Thus, what is needed is a simplified approach to preventing electrolysis in very high strength electric field systems for deactivating microorganisms in food products, The term "electrophoresis" as used herein refers to the process by which charged particles (e.g., relatively large protein molecules) suspended in a solution, such as a fluid food product (i.e., a pumpable food product or a liquid food product), are moved through the solution through application of an electric field to the solution. Electrodes that are used to generate the electric field may or may not be placed into the solution. The electrodes themselves, i.e., the materials from which the electrodes are made, do not participate in electrophoresis other than to generate the electric field.

The term "electrolysis" as used herein refers to the decomposition of a chemical system caused by the passing of an electrical current through the system. Electrolysis includes decomposition of chemical agents into chemical components, electrodeposition or electroplating of metals, reduction of metals, and charging of electrochemical batteries.

SUMMARY OF THE INVENTION

The present invention provides an apparatus and method for deactivating microorganisms in a food product and for preventing or reducing the fouling of a high-energy electrode in such apparatus by a fouling agent within the food product and/or preventing or reducing electrochemical effects within the food product.

In a first embodiment, the electrode is placed into electrical contact with a supply of the food product. In order to deactivate the microorganisms, a very high strength electric field, i.e., greater than 5 kV/cm, and typically greater than 10 kV/cm, is applied to the foodstuff or food product. A charge supply circuit that is coupled by a switch (or switching device) to the electrode supplies charge that flows through the food product in response to a very high strength electric field (at least about 5000 volts/cm).

In order to prevent or reduce the fouling of the electrode (i.e., electrophoresis) by the fouling agent within the food product and/or to prevent electrochemical effects (i.e., electrolysis) in the food product, the switching device of one variation of the first embodiment sequentially configures the charge supply circuit so as to deliver a first current to the electrode, and next configures the charge supply circuit to absorb a second current from the electrode. (The charge supply circuit may be referred to as a charge zeroing network when it is absorbing the second current from the electrode, i.e. when it is removing a residual charge from the electrode.) The first current is delivered in response to the switch assuming a first state, and the second current is absorbed in response to the switch assuming a second state. The first and second states are assumed for first and second time periods respectively, such that the first current and first time period define a first charge, and the second current and the second time period define a second charge, or residual charge. The first and second charges are made to be substantially equal charges, the first being delivered and the second being absorbed by the electrode, by appropriately selecting the first and second currents and the first and second time periods. Thus, the net charge delivered to the electrode is substantially zero after the first and second time periods. It has been found that this zero net charge delivery substantially prevents the agglomeration of the fouling agent on the electrode, and reduces electrolysis or electrochemical effects at the electrodes. (Electrophoretic effects and electrochemical effects are referred to herein as electrical side-effects.) The sequential process of delivering the first and second currents for the first and second time periods, respectively, is repeated for so long as operation of the pulsed field treatment apparatus is desired.

A second embodiment of the invention may be characterized as an apparatus for preventing or reducing the fouling of an electrode in electrical contact with a supply of food product and/or for preventing or reducing electrochemical reactions at the electrode. The apparatus includes (1) a charge supply circuit that is coupled to the electrode; and (2) a switch that is coupled to the charge supply circuit. The switch has a first state in which the switch configures the charge supply circuit to deliver a charge to the electrode, and a second state in which the switch configures the charge supply circuit to substantially absorb the charge from the electrode. The apparatus also includes (3) a controller, coupled to the switch, that controls the switch to assume the first state and the second state during a prescribed period of time. Thus, the controller causes the net charge delivered to the electrode to be approximately zero during the prescribed period of time (by first causing the charge to be delivered, and next causing the charge to be absorbed). In this way the fouling of the electrode and/or the generation of chemical byproducts is substantially prevented.

In a third embodiment, the invention may also be characterized as a method for deactivating microorganisms in a food product. The method includes, first, (a) positioning an electrode in a supply of the food product.

Second, (b) a first voltage signal is applied to the electrode for a first prescribed period of time, causing a first current to flow to the electrode. The first current and the first prescribed period define a first charge. Third, (c) a second voltage signal is applied to the electrode for a second prescribed period of time, causing a second current to flow from the electrode. The second current and the second prescribed period of time define a second charge, or residual charge, and the first charge and the second charge are approximately equal charges. As a result, the net charge transferred to the electrode after the first prescribed period of time and the second prescribed period of time is approximately zero. The sequential application of the first and second voltage signals can be repeated for a prescribed operating period, e.g., until microorganisms have been deactivated in a desired amount of the food product.

The switching device may also be described more broadly as an active or passive circuit that is coupled to the electrode. The net charge delivered by the circuit is substantially (or approximately) zero, with an acceptable magnitude of variation from zero being a function of the rate of agglomeration on the electrode and/or the rate of electrochemical reactions occurring at the electrodes, and a function of the amount or agglomeration and/or electrochemical reaction that is acceptable for a particular application of the present invention, e.g., for a particular food product.

In practice, the active circuit may deliver a plurality of currents for a corresponding plurality of time periods during the delivery period. No one of the plurality of currents, and its corresponding time period, when combined with any other of the plurality of currents, and its corresponding time period, need cause the delivery of the zero net charge. Instead, it is the combination of the plurality of currents delivered during the delivery period that cause the delivery of the zero net charge to the electrode. In one specific example of this embodiment there are an infinite number of currents, each being delivered for an infinitely short time period during the delivery period, as would be the case, e.g., if a continuous current function were applied to the electrode. In this specific example, the net charge delivered is defined by:

$$Q = \int_0^{T_D} I(t)dt = 0 \quad (1)$$

were Q is the charge delivered over the delivery period $T_D$, and wherein I(t) is the continuous current function. Because the last charge delivered to the electrode before the expiration of the delivery period results in the zero net charge being delivered, this last charge can be referenced to as the zeroing charge. Note that a discontinuous current function may also be defined by an infinite number of currents and infinitely short time periods and may thus also be used to practice the teachings of the present invention.

In a further embodiment, the passive circuit delivers the zero net charge. This is accomplished by utilizing the passive circuit coupled to a high voltage power supply and, in general, a switching device. The passive circuit defines a transconductance function G(s), wherein s is a generalized frequency (or complex frequency), and wherein G(O) is approximately 0, i.e., wherein the passive circuit substantially does not pass d.c. in response to the high voltage power supply and the switch. Thus, the currents output from the passive circuit will define the zero net charge as follows:

$$Q = \int_0^{T_D} I(t)dt = 0 \quad (2)$$

were Q is the charge delivered over the pulse period or delivery period $T_D$, and wherein I(t) is the continuous current function. As when the active circuit is used, the last charge delivered to the electrode before the expiration of the delivery period can be referred to as the zeroing charge.

One variation of the above embodiments, prevents an "electrical double layer" at a boundary of the electrode, from charging to more than a reaction potential, i.e., the potential at which electrochemical reactions begin to occur at the electrode. In this variation, the electrochemical reactions caused within the food product by application of a very high strength electrical field are therefore prevented or reduced. The magnitude of the reaction potential (or threshold voltage) is typically about one volt, but is determined as a function of the particular food product being processed and the electrochemical reaction to be prevented or diminished. When current is first applied to the electrode, the current that flows to the electrode is a non-faradaic current, i.e., is current that charges the electrical double layer. This charging of the electrical double layer is in effect capacitive charging, and therefore the electrical double layer is referred to as a "double layer capacitor." Once the double layer capacitor is charged, i.e., once it reaches a reaction potential, faradaic current begins to flow. This occurs when the double layer capacitor's charge reaches about one volt. It is this faradaic current that causes the electrochemical, i.e., electrolysis, reactions within the food product.

In practice, this variation of the above embodiments of the invention prevents the double layer capacitor from charging to a potential greater that the reaction potential, i.e., about one volt, by limiting the amount of charge that flows to the electrode during the first time period, and the second time period. During the first time period, the first current charges the double layer capacitor to less than the reaction potential, and during the second time period, the second current discharges any residual charge from the double layer capacitor. Typically, this residual charge will be close to the amount of charge that flows to the electrode during the first time period because the double layer capacitor discharges very slowly before the second current is applied. Thus, because the only current that flows to the electrode in this variation is non-Faradaic current, electrochemical reactions are prevented from occurring.

Numerous implementations of this variation are contemplated. For example, in the event a reduced level, as opposed to complete prevention, of electrochemical reaction is acceptable for a particular food product, the time during which the potential across the double layer capacitor exceeds the reaction potential can be limited or controlled, as opposed to eliminated. As a result, electrochemical reactions can be reduced to a tolerable level, which may be, for example, a function of the amount of a particular chemical byproduct that is acceptable within the particular food product.

It is thus a feature of the present invention, in some embodiments, to use an electrode to deactivate microorganisms in foodstuffs that contain a fouling agent so as to extend the shelf life of such foodstuffs.

It is another feature of the invention, in some embodiments, to control the delivery of current (and, as a result, electrical charge) to the electrode so as to reduce or substantially prevent the fouling of the electrode with the fouling agent during the process of deactivating the microorganisms.

It is an additional feature of the invention, in further embodiments, to prevent electrochemical, i.e., electrolysis, reactions within the food product.

It is a further feature of the invention, in some embodiments, to prevent or significantly reduce such fouling of the electrode, and/or to prevent or reduce electrochemical reactions in the food product, without the need for complex and costly devices, such as ion permeable membranes.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
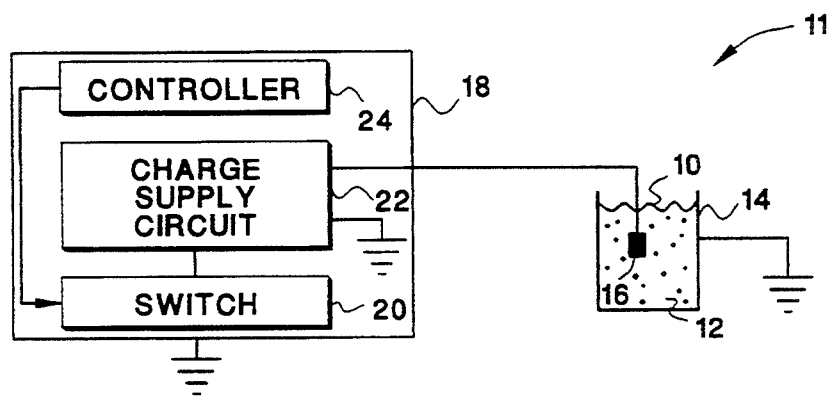
FIG. 1 is a block diagram showing a pulsed field treatment apparatus used for deactivating microorganisms in foodstuffs, and having features of the present invention for preventing or reducing the fouling of a high energy electrode used in such treatment apparatuses, and/or for preventing or reducing electrochemical reactions within the foodstuffs.

Referring first to FIG. 1, a block diagram is shown of a pulsed field treatment apparatus 11 that is used for deactivating microorganisms in foodstuffs. The apparatus includes features of the present invention for preventing or reducing the fouling of a high energy electrode and/or for preventing or reducing electrochemical effects within the food product or foodstuffs.

A liquid foodstuff 10 (having a viscosity of, e.g., less than about 1000 centipoise) is circulated through a treatment zone 12 (or cell) so as to interpose the circulating foodstuff 10 between a first electrode 16 and a second electrode 14, which have a configuration adapted to produce a substantially uniform electric field thereinbetween without dielectric tracking or other breakdown. The cell 12 can thus be said to comprise the electrodes 14, 16, and a circulating space that is between the electrodes through which the foodstuff 10 circulates. Very high strength electric field pulses (having an electric field strength of at least about 5,000 volts per centimeter, preferably at least about 10,000 volts per centimeter) are applied to the electrodes 14, 16 to subject the liquid foodstuff 10 to pulsed field treatment by a pulsed field treatment circuit 18. Preferably the liquid foodstuff 10 has a resistivity of from about 1 to 1000 ohm-centimeters).

As described above, in processing some food products, such as milk or rich protein solutions, a film of material can collect, or agglomerate, on the first electrode 16 and/or second electrode 14 due to electrophoretic transport of the material. Unfortunately, this agglomeration of the film, or fouling agent, on the electrode(s) 14 and/or 16 during processing periods can cause electrical breakdown in the cell 12, fouling or contamination of the system, and in some cases can even cause the circulation of fluid food product through the cell 12 to stop.

As also described above, in processing some food products, electrochemical, i.e., electrolysis, reactions are caused within the food product by the application of the very high strength electric field. These electrolysis reactions can cause chemical byproducts to form within the food product or other degradative effects, thus greatly diminishing the value of the liquid food product treatment system. Electrolysis of water is one of the most likely reactions that can result from processing in a very high strength electric field system. The primary products of electrolysis of water are oxygen ($O_2$ gas) at the anode and hydrogen ($H_2$ gas) at the cathode as indicated in the redox equilibrium:

Anode: $H_2O \longleftrightarrow \frac{1}{2} O_2 + H^+ + 2e^-$,
$E^o = 1.23V$ vs NHE, Cathode: $H^+ + e^- \longleftrightarrow \frac{1}{2} H_2$,
$E^o = 0.00V$ vs NHE, where NHE refers to a "normal hydrogen electrode."

If it is assumed that all of the current through the treatment cell is faradaic, i.e., acts to form these byproducts, the amounts produced can be calculated based on Faraday's law. For example, if all of a typical charge transfer of about 0.01 $C/cm^3$ is faradaic, the resulting concentration of $H_2$ gas and $O_2$ gas is ~52 $\mu M$ and ~26 $\mu M$, respectively. Moreover, the voltage drop across the two electrode-surface interfaces must exceed a formal potential of 1.2 volts for the electrolysis of water to occur. This leads to a 1.2 volt "window" within which negligible electrochemical effects will occur. If the potential across the electrodes does not exceed 1.2 volts, no significant faradaic current will flow and no electrochemical byproducts will be formed.

Another potential electrochemical reaction involves the production of $H_2$ gas and $Cl_2$ gas in aqueous solutions containing NaCl, represented in the following redox equilibrium:

Anode: $2Cl^- \longleftrightarrow Cl_2 + 2e^-$, $E^o = 1.36V$

Cathode: $2H_2O + 2e^- \longleftrightarrow H_2 + 2OH^-$, $E^o = -0.83V$

For a typical liquid food/beverage such as orange juice, the concentration of $Cl^-$ is ~50 mM as compared to a concentration of water of ~55M. If all of a 0.01 $C/cm^3$ charge transfer is faradaic, and the competing water electrolysis and chlorine reactions are partitioned by concentrations, the result is the generation of ~3.3 ppb chlorine gas. As mentioned above, however, no electrochemical reactions will occur until the potential across the electrodes exceeds the electrode formal potentials, in this case 1.36 volts at the anode and —0.83 volts at the cathode. In accordance with some embodiments of the invention, these formal potentials are never reached (such that no electrolysis can occur), or are reached for only a short period of time (such that only a small controlled amount of electrolysis occurs).

Note that in practice, a reaction potential (different from the formal potential) must be reached before significant electrolysis can occur. The reaction potential differs from the formal potential, which is a standardized measurement, because external factors such as $H^+$ concentration or pH, temperature, chemical concentrations, etc. affect the propensity of a particular electrolytic reaction to occur. For example, a formal potential of —0.83V corresponds to hydrogen evolution from the water for a basic solution (pH=14). Exemplary variations in reaction potential as a function of pH are shown in the Table:

TABLE

| pH | $E^o$ ($H_2$ Evolution; V vs NHE) | $E^o$ ($O_2$ Evolution; V vs NHE) | $E^o$ ($Cl_2$ Production; V vs NHE) |
|---|---|---|---|
| 0 | 0 | 1.23 | 1.36 |
| 7 | —0.41 | 0.83 | 1.36 |
| 14 | —0.83 | 0.401 | 1.36 |

At pH=7, production of $H^+$ ions at the anode will shift the pH in the negative direction at the anode. Production of $OH^-$ ions at the cathode will shift the pH in the positive direction at the cathode. Thus, more than 1.23V will be required for the continued electrolysis of water on the basis of these pH shifts. Slow kinetics of the electrode processes, particularly oxygen evolution, can easily add another 0.2 to 0.5V to the required reaction potential.

Just as the hydrogen and oxygen potentials depend on pH, so also the chlorine potential should be corrected for the concentration of chloride and the tolerable level of chlorine:

$$E = E^o + \frac{RT}{2F} \ln \frac{P_{Cl2}}{(C_{Cl^-})^2}$$

where R is the universal gas constant, T is the absolute temperature, $P_{Cl2}$ is the partial pressure of chlorine gas, and $C_{Cl2}$—is the concentration of $Cl^-$ ions. Taking $C_{Cl2}$—$=0.05M$ and $P_{Cl2}=8.8 \times 10^{-8}$ atm (based on the solubility of $Cl_2$ and assuming ~0.5 ppb), which (at 25° C.) results in:

$$E = 1.36 + \frac{0.025692}{2} \ln \left( \frac{8.8 \times 10^{-8}}{(0.05)^2} \right) = 1.23 \text{ V}$$

For chlorine to form, it must compete with the oxygen evolution, which is favored thermodynamically. The poor kinetics of the oxygen reaction can shift the balance toward chlorine, and the low concentration of $Cl^-$ relative to water can shift the balance away from chlorine evolution. However, neither reaction can take place until the reaction potential has been established between electrodes, i.e., across an electrical double layer (or double layer capacitor) that forms at the surface of the electrodes.

In order to charge the capacitance associated with the double layer capacitor, non-faradaic current flows into/out of the electrodes. Until the double layer is charged to a potential equal to the reaction potential of the reacting molecular species, no significant electrochemical (electrolysis) effects occur.

Measurements performed on a typical very high strength electric field treatment indicate a double layer capacitance of ~17 mF. The typical cell is composed of two electrodes, each having an area of ~70 cm² and since the double layer capacitances of the two electrodes are in series, this equates to a specific capacitance of about 480 $\mu F/cm^2$. This is higher than would be expected for a perfectly smooth electrode surface, but is not unreasonable for the relatively rough graphite electrodes that are preferred for the embodiments described herein.

For a 30 kV/cm, 150 J/cc treatment of a food product with electrical resistivity of 200 ohm-cm, the current density is J=150 A/cm² and total charge per unit area is 5 mC/cm². If the very high strength electric field treatment is applied in 2 $\mu$s pulses, the charge transfer per pulse is 300 $\mu C/cm^2$, and ~17 pulses will be required to provide the full treatment, i.e., to effect sufficient deactivation of organisms. During one pulse, the amount by which the electrode potential can change is determined by the charge per unit area for one pulse ($q_A$ ~300$\mu C/cm^2$) and $C_E$, specific capacitance of the electrical double layer (~480 $\mu F/cm^2$). The total voltage change at each electrode due to one pulse will be approximately:

$$V = \frac{q_A}{C_E} = \frac{300 \ \mu C/cm^2}{480 \ \mu F/cm^3} \approx 0.6 \ \text{Volts}$$

which results in ~1.2 volts across the two electrode interfaces, comparable to the formal potential for electrolysis of water (~1.2 volts) and less than the formal potential for the production of chlorine, described above.

For a solution that is initially neutral, the cathode potential must be less than −0.41V for hydrogen evolution to occur. If a reaction potential of 1.23 volts is needed for chlorine to be formed, even at 0.5 ppb (which is a concentration of significance for some food regulatory purposes), the allowed potential drop across the two electrode interfaces is 1.64V. The time required to create a potential of 1.64 volts across the two electrode interfaces can be calculated. Based on the specific capacitances of the two electrode-solution interfaces in series (240 $\mu F/cm^2$) and a current density of 150 A/cm².

Hence, all the current from the 2 $\mu$s pulse will be consumed in charging the electrical double layer, and $$t_1 = \frac{C \Delta V_{dl}}{J} = \frac{240 \times 10^{-6} \times 1.64}{150} = 2.6 \ \mu s$$

the potential at which electrochemical reactions can begin is not reached. In this way, electrolysis, or electrochemical, side-effects can be prevented in the embodiments described herein.

In general, for a product with an electrical resistivity, $\rho$, treated with a pulsed electric field strength, E, it is possible to avoid electrochemical effects by using a pulse width, T, such that:

$$\tau < \frac{C_d V_R \rho}{E} \quad (7)$$

where $C_d$ is the specific capacitance (capacitance per unit area) of the two electrode-solution interfaces in series, and $V_R$ is the potential at which electrochemical reactions can begin, i.e., the reaction potential, (e.g., $V_R \approx 1.64$ volts for chlorine evolution). For pulse widths shorter than that given in Equation 7, the reaction potential is never reached and no significant electrolysis, i.e., electrochemical, reactions can occur.

It is important feature of the embodiments described herein that in order to avoid reaching the reaction potential, the charge, i.e., the residual charge remaining on the double layer capacitors, is removed from the double layer capacitors between very high strength electric field pulses. Otherwise, the double layer capacitors, which otherwise discharge very slowly between very high strength electric field pulses, will eventually accumulate sufficient charge, after some number of pulses, that the reaction potential of the reacting molecular species is reached and some electrochemical effects can occur.

Several techniques, examples of which are described herein, can be used to eliminate net charge transfer and thereby prevent build up of charge on the double layer capacitors. Typically, this can be achieved by discharging the double layer after each very high strength electric field pulse, however, two or more pulses may be delivered without discharging the electrical double layer between pulses so long as the cumulative voltage across the double layer capacitors does not exceed the reaction potential for the reacting molecular species. As described below, these techniques include use of a low voltage bias circuit to provide a canceling charge between pulse, charging the pulse forming circuit through the treatment cell, use of alternating polarity pulses, as well as other possible approaches. These techniques, which can also be used to reduce fouling of the electrodes due to electrophoretic deposition of a fouling agent, function to avoid electrochemistry when the very high strength electric field pulses are sufficiently short to prevent the voltage on the double layer capacitors from reaching the reaction potential.

Advantageously both the electrophoretically induced agglomeration of the fouling agent and the electrolysis chemical reactions can be prevented or reduced by the embodiments of the present invention described herein. In order to achieve such prevention or reduction in the apparatus 11 shown in FIG. 1, a switch (or switching device) 20 first sequentially configures a charge supply circuit 22 so as to deliver, e.g., a first current to the first electrode 16, and next configures the charge supply circuit 22 to absorb, e.g., a second current from the first electrode 16. (Note that the charge supply circuit 22 may more appropriately be referred to as a charge zeroing network when it is absorbing the second current from the first electrode 16). Further, in order to prevent the electrolysis chemical reactions, the time during which the switch 20 configures the charge supply circuit 22 to deliver the first current and the time during which the switch 20 configures the charge supply circuit 22 to absorb the second current should be limited, assuming a given electric field strength, so as to prevent the voltage across the double layer capacitors at each of the electrodes from exceeding the formal potential.

Note that while the currents mentioned herein are described as being "delivered to" or "absorbed from" the first electrode 16, it is to be understood that in practice, the currents may not actually flow between the first electrode 16 and the food product 10. Instead, other electrical effects may account for an effective charge transfer through the cell 12, between the first and second electrodes 16, 14, e.g., ionic transport within the food product 10. In any case, it is accurate to describe the present invention as delivering a zero net charge to the first electrode 16, or achieving the zero net charge through the cell 12.

Alternatively, the invention may be viewed as "absorbing" or "delivering" current from/to the second electrode 14. The first electrode 16, is merely referred to herein for simplicity and by way of example. What is to be emphasized, is that the invention achieves the zero net charge transfer through the cell 12.

The first current is delivered in response to the switch 20 assuming a first state, and the second current is absorbed in response to the switch 20 assuming a second state, wherein the first and second states are assumed for first and second time periods respectively. As mentioned above, the first and second time periods can be limited so that the potential across the double layer capacitors at the first and second electrodes 16, 14 does not exceed the formal potential for the species of electrochemical reaction that is sought to be prevented. The first current and first time period define a first charge, and the second current and the second time period define a second charge or zeroing charge. The first and second charges are, in this embodiment, equal charges, the first being delivered to the first electrode 16 and the second being absorbed from the first electrode 16. Thus, the net charge delivered to the first electrode 16 (and, as a result, through the cell 12) is substantially zero after a delivery period. Advantageously, it has been found that the zero net charge delivery substantially prevents the agglomeration of the fouling agent on the first electrode 16 and/or the second electrode 14. The sequential process of delivering the first and second currents for the first and second time periods, respectively, is repeated during successive delivery periods for so long as operation of pulsed field treatment apparatus is desired.

A controller 24 is coupled to the switch 20 and controls the switch 20 to assume the first and second states for the first and second prescribed time periods. The controller 24 may assume a variety of known forms including a simple timing circuit, or a complex digital or analog computer system, e.g., a personal computer.

Figure 2A:
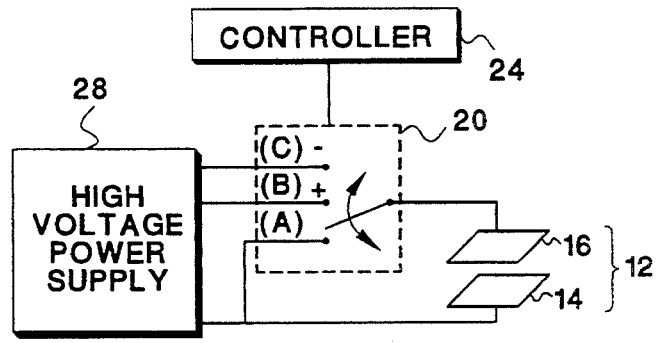
FIG. 2A is a schematic diagram of a first embodiment of the present invention as shown on FIG. 1 wherein an active circuit or switch is used to couple a high voltage power supply to an electrode.

Referring next to FIG. 2A, a schematic diagram is shown of a first embodiment of the present invention, wherein an active circuit or switch 20 selectively couples a high voltage power supply 28 (which in this embodiment comprises the charge supply circuit 22 of FIG. 1) to the first electrode 16.

Various types of active circuits (or active circuit devices), such as the switch 20 shown in FIG. 2A, may be utilized with the first embodiment. It is not essential that the active circuit cause generation of only the first and second currents, during only the first and second time periods, respectively as is described above by way of example. Therefore, it should be understood that a plurality of currents, each potentially having a different magnitude, and a plurality of time periods, each potentially having a different length, may be generated or used by the active circuit. Moreover, the active circuit may generate an infinite plurality of currents, in which case the plurality of time periods is an infinite plurality of infinitely small time periods. Together the plurality of currents and the plurality of time periods define a plurality of charges that, in accordance with the invention, together constitute the zero net charge.

It is also not essential that any one of the plurality of currents, and its corresponding time period, paired with any other of the plurality of currents, and its corresponding time period, result in the zero net charge. Rather, the zero net charge is delivered over a delivery period in response to the plurality of currents and the plurality of time periods that are produced by the active circuit during the delivery period. In practice, the zero net charge is thus delivered periodically, i.e., at the end of the delivery period, with delivery of a non-zero net charge being possible at any time during the delivery period. The length of the delivery period is selected as a function of the amount of fouling agent in the foodstuffs 10 being treated, and the proneness of the foodstuffs to separate from the fouling agent so as to allow the agglomeration of the fouling agent on the first or second electrode 16, 14. Specifically, foodstuffs 10 that are more prone to cause fouling of the first or second electrode 16, 14 will require the selection of a relatively shorter delivery period than those foodstuffs 10 that are less prone to cause fouling of the electrode. Similarly, if electrochemical reactions are to be prevented, the length of the delivery period should be selected such that the voltages across the double layer capacitors at each of the electrodes does not exceed the formal voltages for the species of reactions sought to be prevented. Alternatively, if only a reduction in either the electrochemical reactions or in the fouling of the electrodes is desired, the length of the delivery period can be selected to exceed that delivery period for which fouling, or electrolysis, would be prevented by a prescribed tolerance period. In the case of electrolytic reduction, this prescribed tolerance period defines a prescribed tolerance voltage in excess of the formal voltage, such that Faradic current flows to the electrodes during the tolerance period.

Note also that in practice a sufficient number of the plurality of currents and time periods during each delivery period define charges that are sufficient to generate electric fields within the treatment zone 12 that are large enough to deactivate microorganisms. The sufficient number of the currents and time periods is selected based on the type of foodstuffs 10 being treated or processed, the flow rate, if any, of the foodstuffs through the treatment zone 12, and/or the type of microorganisms being deactivated.

As shown in FIG. 2A, the active circuit device may be the switch 20. The switch 20, assumes, e.g., a first state (a) for a delay period. Next, the switch 20 assumes a second state (b) for a first prescribed period during which a first current is delivered to the first electrode 16 by the power supply 28. The voltage delivered by the power supply is in this embodiment at least 2000 volts, e.g., 5000 volts or more. The first prescribed period is optionally followed by an additional delay period during which the switch 20 again assumes the first state position (a). The switch 20 then assumes a third state (c) for a second prescribed period. While the switch 20 is in the third state (c), a second current is absorbed from the first electrode 16 by the power supply 28. The delay period, the first time period, the additional delay period and the second time period constitute the delivery period. The switch 20 assumes each of these states in response to the controller 24.

Figure 2B:
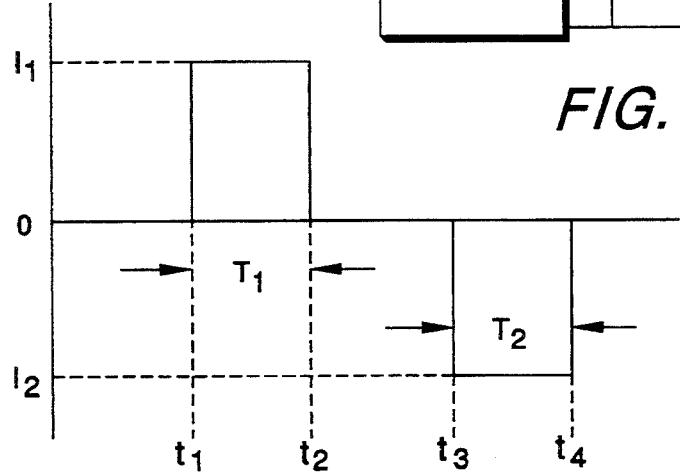
FIG. 2B is an exemplary graph showing a first current and a second current, generated by the first embodiment as shown in FIG. 2A, on the vertical axis, and showing a first time period and a second time period, during which the currents, respectively, are generated, on the horizontal axis.

A timing waveform diagram of this operation is shown in FIG. 2B. The first current $I_1$ and the first time period $T_1$ define the first charge that is delivered by the power supply 28, and the second current $I_2$ and the second time period $T_2$ define the second charge that is absorbed by the power supply 28. (In this embodiment, the power supply 28 can be referred to as the charge supply circuit during the first time period when it delivers the first current and as the charge zeroing circuit during the second time period when it absorbs the second current.) By appropriately selecting the first and second prescribed time periods, and the first and second currents, the first and second charges are made to be equal charges—the first being delivered to the electrode, and the second being absorbed by the electrode. For example, the first and second prescribed time periods might be two microsecond time periods, and the first and second currents might be 20,000 amp currents. Note that in this embodiment, both the first and second currents will generally be of sufficient magnitude to cause the deactivating of microorganisms in the supply of food product 10. In this way the substantially zero net charge is delivered to the first electrode 16 after the first and second time periods. As mentioned above, the delivery of the zero net charge substantially prevents or reduces the agglomeration of the fouling agent on the first electrode 16 and/or the second electrode 14, and-/or prevents or reduces electrochemical reactions within the food product 10.

The switch 20 may assume many forms within the scope of this invention. For example, the switch 20 may be a mechanical switch wherein the first, second and third states comprise physical positions of a single pole, triple throw (SPTT) type switch—the first state (a) corresponding to a grounded position, the second (b) to a positive position, and the third (c) to a negative position. Alternatively, the switch 20 may comprise two pulse generators, e.g., two tube pulsers, each producing a pulse that is opposite in polarity to the other and timed so as not to overlap with the other. Numerous other forms of switches 20 are contemplated within the scope of this invention, and are known to those skilled in the art of electronic design. As described above, the controller 24 is used to control the state of the switch 20, and may be of conventional design, e.g., including timing circuits that set the duration and amplitude of the current pulses, which in turn cause the generation of the very high strength electric field pulses.

Note that in FIG. 2A, the switch 20 is shown as connected to only three possible positions (a), (b) or (c), each of which cause the delivery of current to the electrode 12. However, it should be understood that the switch 20 could, within the scope of the present invention, be connected to an infinite number of possible positions, each of which corresponds to a specific one of an infinite plurality of currents that are to be delivered to the cell 12 for a corresponding specific one of an infinite plurality of infinitely small time periods.

In this way the zero net charge is delivered to the first electrode 16 in response to the switch 20, or other active circuit, which configures the high voltage power supply to deliver the plurality of currents for the corresponding plurality of time periods. As a result, the zero net charge is delivered to the electrode 12 during the delivery period.

Figure 3:
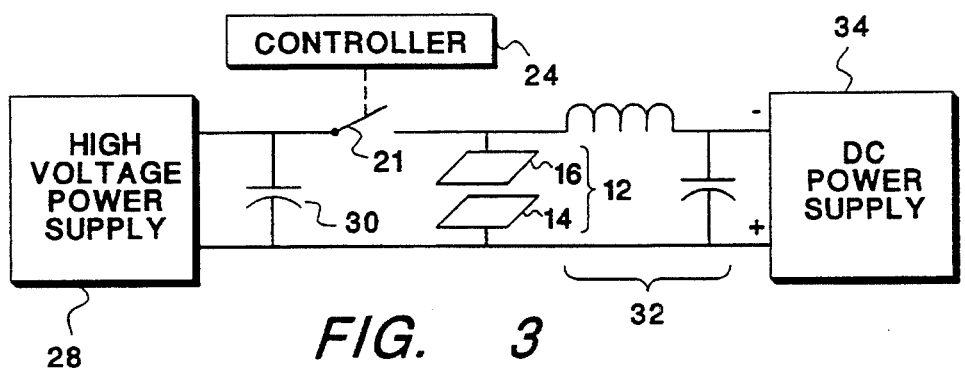
FIG. 3 is a schematic diagram of an implementation of the first embodiment of the invention as shown in FIG. 1 wherein a pulse forming network is selectively charged with a first charge by a high voltage power supply, and then discharged to the electrode; and wherein a second charge is absorbed from the electrode using a bias power supply so as to deliver a zero net charge to the electrode.

Referring next to FIG. 3, a schematic diagram is shown of an implementation of the first embodiment of the invention wherein the high voltage power supply 28 is connected in a parallel combination with the pulse forming network 30. The parallel combination is in series with a single pole, single throw (SPST) switch 21, or an equivalent switching device, and the cell 12. When the switch 21 assumes an open state, the high voltage power supply 28 charges the pulse forming network 30.

After remaining open for a period of time sufficient to charge the pulse forming network 30, the switch 21 assumes a closed state for the first prescribed period of time (or first time period), causing the pulse forming network 30 to deliver the first current through the cell 12. The pulse forming network delivers a voltage to the electrodes of at least 2000 volts, e.g., 5000 volts or more. The first current is a relatively high current, e.g., 20,000 amperes, and the first time period is a relatively short time period, e.g., two microseconds. The delivery of the first current continues for the first prescribed time period. The high voltage power supply 28, which is in parallel with the pulse forming network 30, makes a negligible contribution to the first current.

During the second prescribed time period (or second time period), which in this embodiment follows immediately after the first prescribed time period, the switch 21 again assumes the open state, and the pulse forming network 30 is again charged by the high voltage power supply. The switch 21 assumes both the open and closed states in response to the controller 24.

Also during the second prescribed time period, a bias power supply 34, coupled in parallel with the cell 12, causes the second current to be absorbed from the first electrode 16. The second current is a relatively small current, e.g., one ampere, and the second time period is a relatively long time period, e.g., forty milliseconds. In this embodiment, the high voltage power supply 28, the pulse forming network 30, a low pass filter 32 (described below), and the bias power supply 34 together comprise the charge supply circuit 22 (FIG. 1). The low pass filter 32 and bias power supply 34 comprise the charge zeroing circuit.

Note in FIG. 3 that the bias power supply 34 remains coupled to the cell 12 during both the first and second time periods, i.e., when the switch 21 is open or closed, and also note that the low pass filter 32 is interposed between the cell 12 and the bias power supply 34 so as to protect the bias power supply 34 from the first current during the first time period. Note also that the relatively small second current makes a negligible negative contribution to the first current during the first time period.

In this way, the first current flows to the first electrode 16 during the first prescribed time period, and the second current flows from the first electrode 16 during the second time period.

As with the first embodiment as described in FIG. 2A, the first and second currents, and first and second time periods of this implementation, define equal first and second charges. Thus, the zero net charge is transferred from the electrode into the food product after the first and second prescribed time periods, i.e., after the delivery period.

Figure 4:
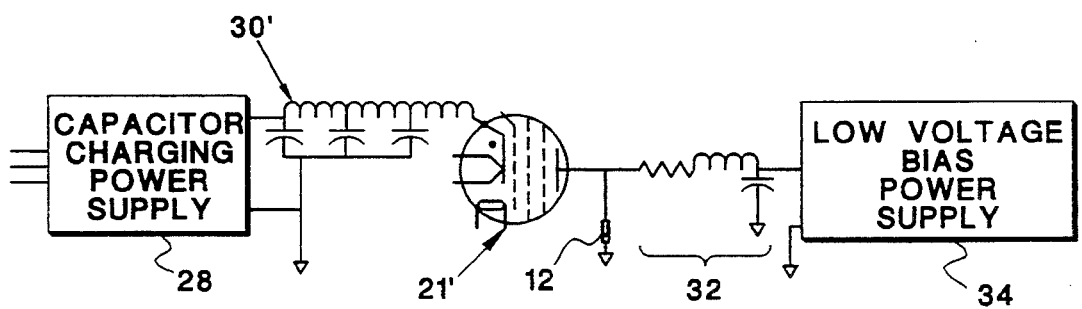
FIG. 4 is a detailed schematic diagram of the implementation of the first embodiment as shown more generally in FIG. 3.

Referring to FIG. 4, a detailed schematic diagram is shown of the implementation of FIG. 3 of the second embodiment. A thyratron switch 21' is used as the switch 20 (FIG. 3), and a series/parallel network 30' of capacitors and inductors is used as the pulse forming network 30 (FIG. 3). A suitable thyratron switch 21' for this purpose is the F-175 available from ITT Corporation, Electron Technology Division of Easton, Penna. The low pass filter 32 is designed to prevent high voltage pulses delivered from the pulse forming network 30' from damaging the bias power supply 34. This is done by choosing values of, e.g., resistance and capacitance for components within the low pass filter 32 design that adequately attenuate the relatively short high voltage pulses, but provide little attenuation to the continuous low voltage d.c. current generated by the bias power supply 34. The bias power supply 34 is selected to provide a d.c. current at a relatively low voltage, e.g., fifty volts, and in response thereto, to deliver the second or zeroing charge, which is equal and opposite to the first charge delivered to the cell 12 by the pulse forming network 30.

Figure 5:
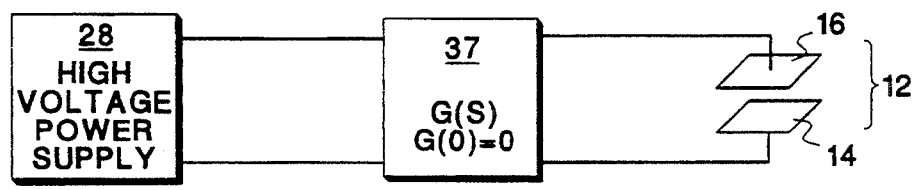
FIG. 5 is a schematic diagram of a second embodiment of the present invention as shown in FIG. 1 wherein a high voltage power supply, and a passive circuit having a transconductance function G(s), wherein s is a generalized frequency, and wherein G(0)=0, are used to deliver the zero net charge to the electrode.

Referring next to FIG. 5, a second embodiment of the present invention is shown wherein a passive circuit 37, having transconductance function G(s), is coupled with the high voltage power supply 28, and the cell 12. The transconductance function G(s) has a characteristic that for s=0, G(O)=0, or, in other words, the passive circuit 37 does not pass d.c. Several implementations of the passive circuit 37 that can be utilized to realize this second embodiment are described below in FIGS. 6–14.

Figure 6A:
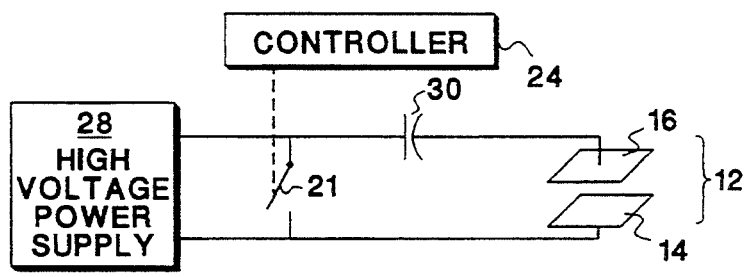
FIG. 6A is a first implementation of the second embodiment wherein a pulse forming network is slowly charged through the electrode, and then quickly discharged through the electrode.
Figure 6B:
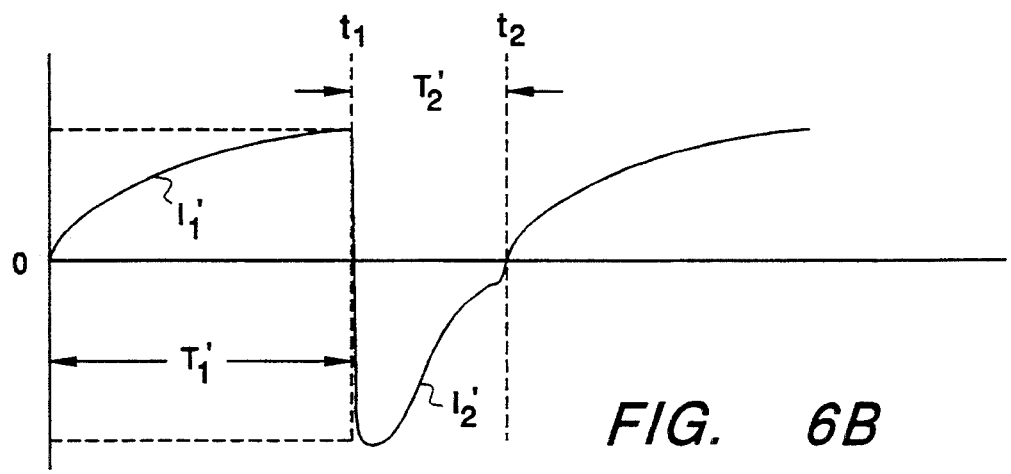
FIG. 6B is an exemplary graph showing the first current and the second current, generated by the second embodiment as shown in FIG. 6A, on the vertical axis, and showing a first time period and a second time period, during which the currents, respectively, are generated, on the horizontal axis.

Referring next to FIG. 6A, a first implementation of the second embodiment is shown wherein the SPST switch 21 or equivalent switching device, is coupled in a parallel combination to the high voltage power supply 28. Such parallel combination is connected in series with a pulse forming network 30 and the cell 12. In this embodiment, the power supply 28 and the pulse forming network 30 comprise the charge supply circuit 22 (FIG. 1). When the switch 21 is in a first state, i.e., an open state, the power supply 28 slowly charges the pulse forming network 30 through the cell 12, causing a relatively small first current $I_1'$, as illustrated in FIG. 6B, to flow to the first electrode 16, effectively into the food product 10, and effectively into the second electrode 14. Note that in this embodiment, the first current $I_1'$ will generally not be sufficiently large to deactivate microorganisms. When the switch 21 is in the open state, the switch 21 does not make an electrical connection, i.e., it is an open circuit, between its terminals. Thus, the power supply 28, the pulse forming network 30, and the first electrode 16 are connected in series whenever the switch 21 is in the open state.

The switch 21, controlled by the controller 24, assumes the open state for the first prescribed time period, $T_1'$, and then assumes a closed state for the second prescribed time period, $T_2'$, as illustrated in FIG. 6B. The switch 21 assumes each of these states as controlled by the controller 24. No delay periods, between, before, or after the first and second time periods, are used in this implementation. In the closed state, the pulse forming network 30 quickly discharges through the switch 21, causing a relatively high second current $I_2'$ to effectively flow from the first electrode 16. Note that the pulse forming network 30 can also be referred to as the charge zeroing circuit during the second prescribed time period. The second current is sufficiently large to deactivate microorganisms.

When the switch 21 is in the closed state, the switch 21 makes an electrical connection, i.e., it is a short circuit, between its terminals. Thus, the pulse forming network 30 and the cell 12, including the first and second electrodes 16, 14, are connected in series whenever the switch 21 is in the closed state, causing the power supply 28 to be effectively shorted out. (Note, the high voltage power supply contains internal short-circuit protection that prevents damage to it during the time the switch 21 is closed).

The first period $T_1'$ and the small first current $I_1'$ define the first charge that is delivered to the first electrode 16, and the second period $T_2'$ and the larger second current $I_2'$ define the second charge that is absorbed from the first electrode 16. Because the first and second charges are substantially equal, the zero net charge is delivered to the electrode 16, i.e., through the cell 12.

Figure 7:
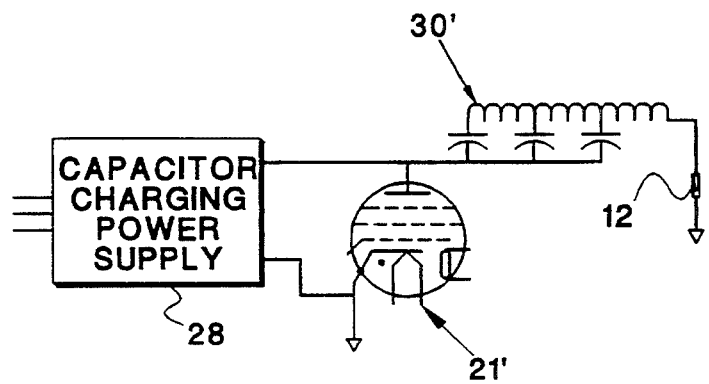
FIG. 7 is a detailed schematic diagram of the first implementation of the second embodiment of the invention as shown more generally in FIG. 6A.

Referring next to FIG. 7, a detailed schematic diagram is shown of the first implementation of the second embodiment. A thyratron switch 21' is used to provide the function of the switch 21 (FIG. 6A), and a series/parallel network 30' of capacitors and inductors is used as the pulse forming network 30 (FIG. 6A). The thyratron switch 21' may be the same as the thyratron switch 21' described above in connection with FIG. 4. Of course, other types of switch devices that provide the SPST switch function could also be used, such as triodes, bipolar junction transistors, field effect transistors, silicon controlled rectifiers, and the like.

Figure 8:
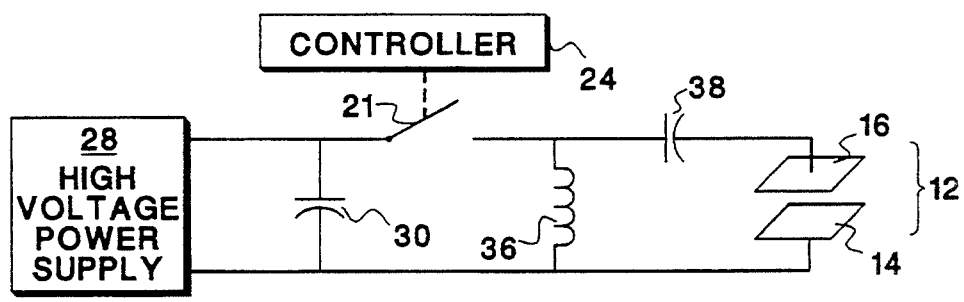
FIG. 8 is a schematic diagram of a second implementation of the second embodiment as shown in FIG. 5 wherein a pulse forming network is selectively charged with a first charge by a high voltage power supply, and then discharged through a coupling capacitor to the electrode; and wherein a second charge from the coupling capacitor is absorbed from the electrode, and discharged into a discharge element.

Referring next to FIG. 8, a second implementation of the second embodiment of the present invention is shown wherein the high voltage power supply 28 is connected in parallel combination with the pulse forming network 30, and such parallel combination is connected in series with the SPST switch 21, and a discharge element 36. The cell 12 is connected in parallel across the discharge element 36 through a coupling capacitor 38. The high voltage power supply 28, the pulse forming network 30, the discharge element 36, and the coupling capacitor 38 function as the charge supply circuit 22 (FIG. 1) in this embodiment. The discharge element 36 and the coupling capacitor 38 function as the charge zeroing circuit.

In operation, the SPST switch 21 first assumes the open state for a period of time sufficient to charge the pulse forming network 30. In response to the switch 21 assuming the open state, the high voltage power supply 28 charges the pulse forming network 30. Second, the switch 21 assumes the closed state for the first prescribed period of time. In response to the switch 21 assuming the closed state, the pulse forming network 30 discharges through the coupling capacitor 38 causing the first current to flow to the first electrode 16.

Separate from the first current, a portion of the pulse forming network's discharge occurs through the discharge element 36. However, the impedance of the discharge element 36 is selected such that most of the energy is discharged through the cell 12, i.e., the impedance of the discharge element 36 is very high relative to the impedance of the pulse forming network 30. Furthermore, the coupling capacitor 38 is selected so as to have a capacitance much larger, e.g., on the order of one-hundred times greater, than the capacitance of the pulse forming network 30 such that most, e.g., on the order of 99%, of the voltage drop caused by the first current occurs across the cell 12, i.e., between the first and second electrodes 16, 14 and not across the coupling capacitor 38.

After the first prescribed time period, the switch 21 returns to the open state for a second prescribed time period. While the switch 21 is in the open state, the coupling capacitor 38 discharges through the discharge element 36, thereby causing the second current to flow through the cell 12 for the second period of time. Also during the second period of time, power supply 28 again charges the pulse forming network 30, as described above. The SPST switch 21 assumes both the closed and open states as controlled by the controller 24.

In this way the current, caused by the discharging of the pulse forming network 30, is delivered to the first electrode 16 during the first time period, and the second current, caused by the discharging of the coupling capacitor 38, is absorbed from the first electrode 16 during the second time period. Generally in this embodiment, the second current is much smaller than the first current, and the second time period is much longer than the first time period.

As in the above embodiments, the first current and first time period define a first charge to be delivered to the first electrode 16, and the second current and the second time period define a second charge to be absorbed from the first electrode 16. By appropriately selecting such currents and time periods, the first and second charges are made to be equal charges and the zero net charge is transferred to the first electrode 16, i.e., through the cell 12, after the first and second time periods.

Figure 9:
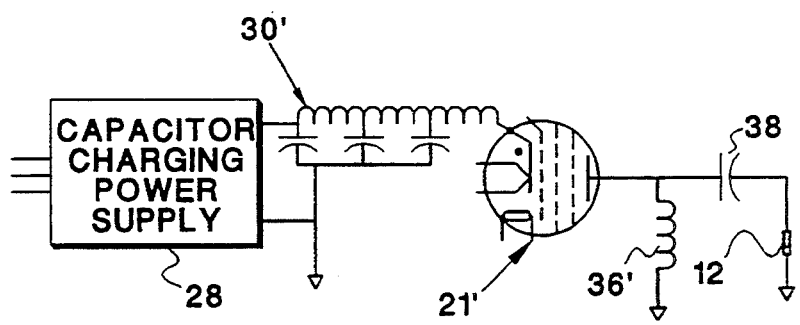
FIG. 9 is a detailed schematic diagram of the second implementation of the second embodiment of the present invention as shown more generally in FIG. 8.

Referring to FIG. 9, a detailed schematic diagram of the second implementation of the second embodiment is shown. Again, a thyratron switch 21' is used as the switch 21 (FIG. 8), and a series/parallel network 30' of capacitors and inductors is used as the pulse forming network 30 (FIG. 8). An inductor 36' is used as the discharge element 36. Representative values of the inductor 36' and the coupling capacitor 38 are 10 mH and 100 μF, respectively.

Figure 10:
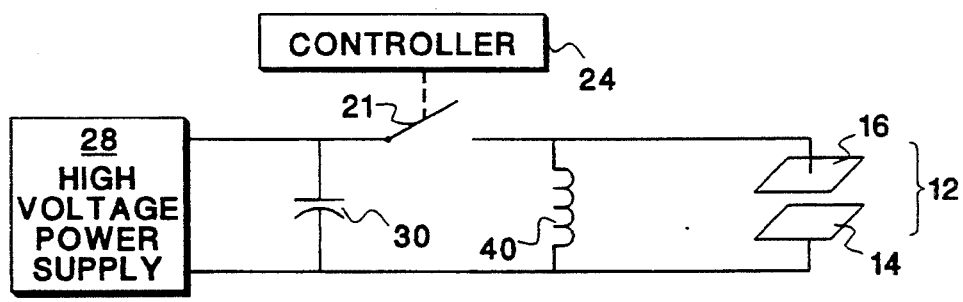
FIG. 10 is a schematic diagram of a third implementation of the second embodiment as shown in FIG. 5 wherein a pulse forming network is selectively charged with a first charge by a high voltage power supply, and then discharged to the electrode; and wherein a second charge is absorbed from the electrode into a shunt inductor.

Referring to FIG. 10, a third implementation of the second embodiment of the invention is shown. This embodiment is similar to the second implementation of the second embodiment, except that it lacks the coupling capacitor 38, and the discharge element 36 consists of a shunt inductor 40. In other words, the third implementation consists of the high voltage power supply 28 connected in a parallel combination with a pulse forming network 30. Such parallel combination is further connected in series with the SPST switch 21, and the shunt inductor 40; with the cell 12 being connected in parallel with the shunt inductor 40. The high voltage power supply 28, the pulse forming network 30, and the inductor function as the charge supply circuit 22 (FIG. 1) in this embodiment. The shunt inductor 40 functions as the charge zeroing circuit.

During a charging time period of sufficient duration, the pulse forming network 30 is charged as described above in connection with the second implementation. At the end of this charging period, the switch 21 switches to the closed state and the first current begins to flow to the first electrode 16 for the first time period.

Figure 11:
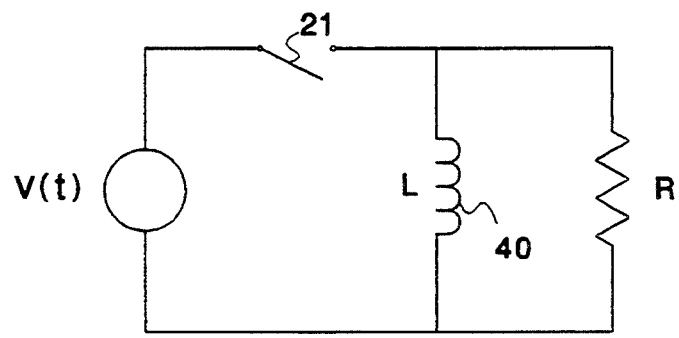
FIG. 11 is a schematic diagram of a model circuit used to approximate the circuit of the third implementation of the second embodiment as shown in FIG. 10.

FIG. 11 illustrates the operation of the third implementation of the second embodiment. In FIG. 11, the third implementation of the second embodiment of FIG. 10 is approximated by a voltage supply V(t), which corresponds to the high voltage power supply 28 and the pulse forming network 30, connected in series with a switch 21 and a parallel combination that includes the shunt inductor 40 and a resistance R. The resistance R approximates the total resistance of the first electrode 16, the food product 10, and the second electrode 14, i.e., the resistance of the cell 12.

During the first time period, a first current flows through the cell 12, and a second current begins to flow in the shunt inductor 40, which causes a magnetic field to expand around the shunt inductor 40 as is known in the art. In response to the first current, the first charge is delivered to the first electrode 16. After the first time period, the switch 21 assumes the open state in response to the controller 24. As a result, the first current ceases to flow through the cell 12 and the second current continues to flow through the shunt inductor 40 as the magnetic field begins to collapse. Consequently, the second current begins to flow from the first electrode 16, and the second charge is transferred from the first electrode 16. The inductance of the shunt inductor 40 and the duration of the first time period are selected so as to cause the first charge to be substantially equal to the second charge, thereby causing the zero net charge to flow to the first electrode 16 after the first and second time periods.

Figure 12:
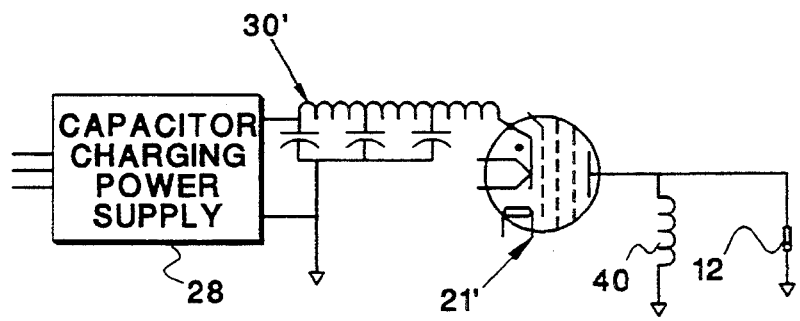
FIG. 12 is a detailed schematic diagram of the third implementation of the second embodiment of the present invention as shown more generally in FIG. 10.

Referring next to FIG. 12, a detailed schematic diagram is shown of the third implementation of the second embodiment. As above, the thyratron switch 21' is used as the SPST switch 21 (FIG. 10), and the series/parallel network 30' of capacitors and inductors is used as the pulse forming network 30 (FIG. 10).

Figure 13:
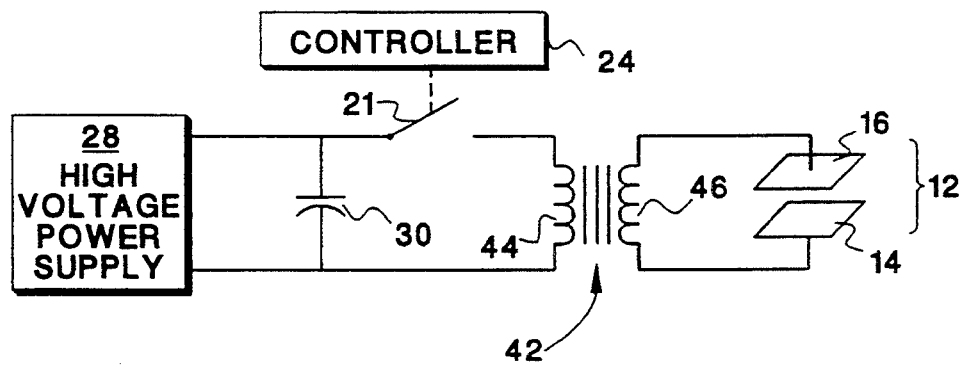
FIG. 13 is a schematic diagram of a fourth implementation of the second embodiment of the present invention as shown in FIG. 5, wherein a pulse forming network is selectively charged with a first charge by a high voltage power supply, and then discharged through a pulse transformer to the electrode; and wherein a second charge from the electrode is absorbed by the pulse transformer.

Referring next to FIG. 13, a fourth implementation of the second embodiment of the invention is shown wherein the shunt inductor 40 is replaced by a pulse transformer 42. A primary coil 44 of the transformer 42 is coupled in series with the pulse forming network 30 and the SPST switch 21, and a secondary coil 46 of the transformer 42 is coupled in series with the cell 12. As in the third implementation (FIGS. 10 and 12) the high voltage power supply 28 is in parallel with the pulse forming network. In this implementation, the high voltage power supply 28, the pulse forming network and the transformer 42 function as the charge supply circuit 22 (FIG. 1). The pulse transformer 42 serves as the charge zeroing circuit.

The fourth implementation functions similarly to the third implementation of FIGS. 10 and 12 with the pulse transformer 42 having a magnetizing inductance that is designed to function as the shunt inductance of the shunt inductor 40 (FIGS 10 and 12). In this way, the first and second charges are delivered to (or absorbed from) the first electrode 16. Because, as above, the first and second charges are equal charges, the zero net charge passes through the cell 12 after the first and second time periods.

Figure 14:
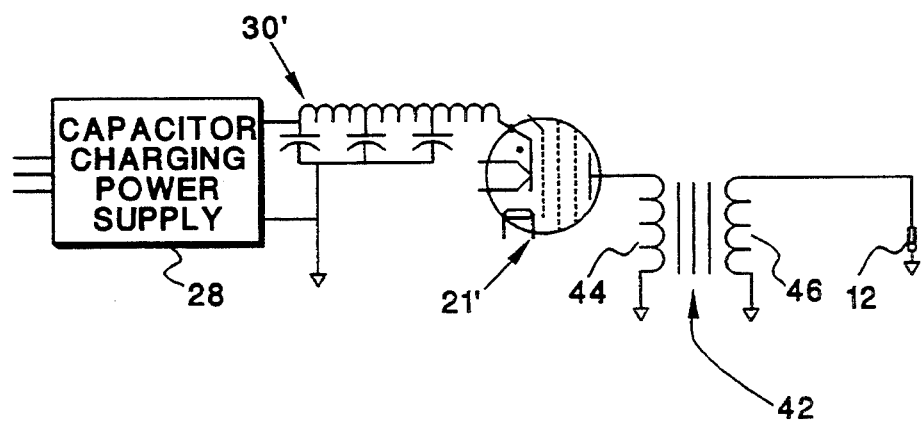
FIG. 14 is a detailed schematic diagram of the fourth implementation of the second embodiment of the invention as shown more generally in FIG. 13.

FIG. 14 shows a detailed schematic diagram of the fourth implementation of the second embodiment. As above, the thyratron switch 21' functions as the SPST switch 21 (FIG. 13), and a series/parallel network 30' of capacitors and inductors is used as the pulse forming network 30 (FIG. 13). The pulse transformer 42 may be of conventional design, having a peak current capacity of, e.g., 20,000 amps.

While the invention herein disclosed has been described by means of specific embodiments and applications thereof, numerous modifications and variations could be made thereto by those skilled in the art without departing from the scope of the invention as set forth in the claims:

What is claimed is:

1. In a pulsed very high strength electric field system for deactivating organisms within a supply of food product, a method of reducing electrical side-effects within the supply of food product, the method comprising:
- (a) positioning the electrode in the supply of the food product;
- (b) applying a first voltage signal to the electrode for a first prescribed period of time, said first voltage signal having a magnitude of at least 2000 volts and causing a first current to flow to the electrode, said first current and said first prescribed period of time defining a first charge; and
- (c) applying a second voltage signal to the electrode for a second prescribed period of time, said second voltage signal causing a second current to flow to the electrode, said second current being of an opposite polarity from said first current, said second current and said second prescribed period of time defining a second charge, said first charge and said second charge being substantially equal charges;
- whereby the net charge transferred to the electrode after the first prescribed period of time and the second prescribed period of time is approximately zero;
- whereby the electrical side-effects within the supply of food product are reduced.

2. The method of claim 1 wherein said first voltage signal is relatively larger than said second voltage signal, and wherein said first prescribed time period is relatively shorter than said second prescribed time period.

3. The method of claim 1 including:
- (d) repeating step (b) and step (c) for a prescribed operating period.

4. A very high strength electric field system for deactivating organisms in a food product, the system including:
- means for establishing a supply of food product in electrical contact with the electrode;
- means for delivering a first charge from a charge supply circuit to the electrode, the means for delivering the first charge including means for generating a voltage of at least 2000 volts; and
- means for delivering a second charge from the charge supply circuit to the electrode; and
- means for making said first charge and said second charge substantially equal in magnitude and opposite in polarity such that the net charge transferred to the electrode over a prescribed period of time is approximately zero;
- whereby electrical side-effects within the food product are reduced.

5. The system of claim 4 wherein said first delivering means comprises:
- power supply means for supplying a source current;
- charge storage means for storing the source current as said first charge; and
- charge coupling means for selectively discharging said first charge from the charge storage means into the electrode.

6. The system of claim 5 wherein said delivering means includes discharge means for absorbing said second charge from said electrode.

7. The system of claim 6 wherein said charge storage means comprises at least one capacitor, and wherein said charge coupling means comprises a switch.

8. A very high strength electric field apparatus for deactivating organisms in a food product, said apparatus including:
- an electrode in electrical contact with a supply of the food product;
- a pulse forming network coupled to the electrode, wherein the pulse forming network is capable of delivering a pulse voltage signal to the electrode, the pulse voltage signal having a voltage magnitude of at least 2000 volts;
- a power supply coupled to the pulse forming network, wherein said power supply charges the pulse forming network with the pulse voltage signal;
- a charge zeroing circuit coupled to the electrode, wherein the charge zeroing circuit delivers a net charge zeroing voltage signal to the electrode; and
- a switch coupled to the pulse forming network and to the charge zeroing circuit,
- said switch having a first state in response to which the pulse voltage signal is delivered to the electrode, which pulse voltage signal causes a first charge to be transferred to the electrode, and
- said switch having a second state in response to which the net charge zeroing voltage signal is delivered to the electrode, which net charge zeroing voltage signal causes a second charge to be transferred from the electrode,
- said first charge being approximately equal to said second charge such that the net charge delivered to the electrode in response to the switch serially assuming the first and second states is approximately zero;
- whereby electrical side-effects within the supply are reduced.

9. The apparatus of claim 8 wherein said pulse forming network includes at least one capacitor, and wherein said charge zeroing circuit also includes said at least one capacitor.

10. The apparatus of claim 9 wherein said switch is in a parallel combination with said power supply, and wherein said pulse forming network and said electrode are in series with the parallel combination.

11. The apparatus of claim 8 wherein said pulse forming network includes at least one capacitor, and wherein said charge zeroing circuit includes a d.c. power supply.

12. The apparatus of claim 11 wherein said pulse forming network is in a parallel combination with said power supply, wherein said electrode is in series with said switch and said parallel combination, and wherein said charge zeroing circuit is in parallel with said electrode.

13. The apparatus of claim 8 wherein said pulse forming network includes at least one capacitor, and wherein said charge zeroing circuit includes a discharge element through which said second charge is transferred.

14. The apparatus of claim 13 wherein said pulse forming network is in a first parallel combination with said power supply, wherein said electrode is in a second parallel combination with said discharge element, and wherein said second parallel combination is in series with said first parallel combination and said switch.

15. The apparatus of claim 13 wherein said charge zeroing circuit further includes a coupling capacitor through which the pulse forming network delivers the pulse voltage signal.

16. The apparatus of claim 15 wherein said pulse forming network is in a first parallel combination with said power supply, wherein said electrode is in a first series combination with said coupling capacitor, wherein said series combination is in a second parallel combination with said discharge element, and wherein said second parallel combination is in series with said first parallel combination and said switch.

17. The apparatus of claim 8 wherein said pulse forming network includes at least one capacitor, and wherein said charge zeroing circuit includes a pulse transformer.

18. The apparatus of claim 17 wherein said pulse forming network is in a parallel combination with said power supply, wherein a primary coil of said pulse transformer is in series with said parallel combination and said switch, and wherein said electrode is in series with a secondary coil of said pulse transformer.

19. A very high strength electric field apparatus for deactivating organisms within a supply of food product, said apparatus comprising:
   a charge supply circuit coupled to the electrode, the charge supply circuit including means for generating a voltage of at least 2000 volts;
   a switch coupled to the charge supply circuit,
   said switch having a first state in which the switch configures the charge supply circuit to deliver a charge to the electrode,
   said switch having a second state in which the switch configures the charge supply circuit to substantially absorb the charge from the electrode; and
   controller means coupled to the switch for controlling the switch to assume the first state and the second state so that the charge delivered to the electrode is approximately zero over a prescribed period of time;
   whereby electrical side-effects within the supply of food product are reduced.

20. The apparatus of claim 19 wherein said charge supply circuit includes a power supply, and a pulse forming network comprising at least one capacitor.

21. An apparatus for deactivating organisms in a food product, said apparatus including:
   a current generator coupled to the electrode, wherein the current generator causes the delivery to the electrode of at least one current pulse during a specified time period, wherein the at least one current pulse defines at least one charge, wherein an electrical field resulting from the at least one current pulse has an electric field strength of at least 5,000 volts/cm, passes through the food product in response to the delivery of the at least one charge, and deactivates the organisms; and
   charge zeroing means for causing a zeroing charge to be delivered to the electrode during the specified time period that, together with the at least one charge, causes an approximately zero net charge to be delivered to the electrode within the specified time period.

22. The apparatus of claim 21 wherein the charge zeroing means includes bias power supply means for delivering a bias current for a zeroing period, wherein the bias current and the zeroing period define said zeroing charge.

23. The apparatus of claim 21 wherein the charge zeroing means includes a passive circuit means having a transconductance function G(s) wherein s is a generalized frequency, and wherein G(O) is approximately 0.

24. The apparatus of claim 23 wherein the charge zeroing means includes pulse forming network means for being charged by said current generator in response to a switching device assuming an open state, and for being discharged in response to the switching device assuming a closed state, wherein said pulse forming network means is also for delivering said at least one charge when the pulse forming network means discharges and for delivering said zeroing charge when the pulse forming network means charges.

25. The apparatus of claim 23 wherein the charge zeroing means includes coupling capacitor means for charging with said at least one charge in response to the delivery to said electrode of said at least one charge through the coupling capacitor means, and discharge element means for delivering said zeroing charge to said electrode by discharging said at least one charge from the coupling capacitor means.

26. The apparatus of claim 23 wherein the charge zeroing means includes shunt inductor means for generating an expanding magnetic field in response to said delivery to said electrode of said at least one charge, and for generating said zeroing charge in response to the collapsing of the magnetic field.

27. The apparatus of claim 23 wherein the charge zeroing means includes pulse transformer means for causing expanding of a magnetic field in response to said delivery to said electrode of said at least one charge, and for generating said zeroing charge in response to collapsing of the magnetic field.

28. In a pulsed very high strength electromagnetic field system for deactivating organisms within a supply of food product, the food product containing charged particles, a method of reducing an electrochemical reaction of a prescribed reacting material species within the supply of food product, the method comprising:
   (a) positioning a first electrode in the supply of the food product;
   (b) applying a first voltage signal to the first electrode for a first prescribed period of time, said first voltage signal causing a first current to flow to the first electrode and causing a first electrical double layer at the first electrode to charge to a prescribed voltage, the prescribed voltage not exceeding a reaction voltage of the prescribed reacting material species for more than a prescribed threshold period, said first current and said first prescribed period defining a first charge; and
   (c) applying a second voltage signal to the first electrode for a second prescribed period of time, said second voltage signal causing a second current to flow from the first electrode and causing the electrical double layer at the first electrode to discharge, said second current and said second prescribed period of time defining a second charge, wherein said first charge and said second charge are substantially equal charges;
   whereby the net charge transferred to the first electrode after the first prescribed period of time and the second prescribed period of time is approximately zero;
   whereby electrochemical effects within the supply of food product are reduced.

29. The method of claim 28 wherein step (b) includes applying said first voltage signal to said first electrode for said first prescribed period of time, said first voltage signal causing said electrical double layer at said first electrode to charge to a prescribed voltage, said prescribed voltage not exceeding said reaction voltage of said prescribed reacting material species, thereby preventing said electrochemical reaction of said prescribed reacting material species within said supply of food product.

30. The method of claim 28 wherein step (b) includes applying said first voltage signal to said first electrode for said first prescribed of time, said first prescribed period being defined by $$\tau < \frac{C_d V_R \rho}{E}$$

wherein $\tau$ is said first prescribed period of time; $\rho$ is electrical resistivity of said food product; E is electric field strength of an electrical field caused by said first voltage signal; $C_d$ is a first capacitance per unit area of said first electrical double layer in series with a second capacitance per unit area of a second electrical double layer, said second electrical double layer being at a second electrode; and $V_R$ is said reaction voltage for said prescribed reacting material species.

31. An apparatus for deactivating organisms in a food product, said apparatus including:
a current generator coupled to the first electrode, wherein the current generator causes the delivery to the first electrode of at least one current pulse during a specified time period, the at least one current pulse causing a first electrical double layer at the first electrode to charge to a prescribed voltage, the prescribed voltage not exceeding a reaction voltage of a reacting material species for more than a prescribed threshold period, wherein the at least one current pulse defines at least one charge, and wherein an electric field resulting from the at least one current pulse passes through the food product in response to the delivery of the at least one charge and deactivates the organisms; and
charge zeroing means for causing a zeroing charge to be delivered to the first electrode during the specified time period that, together with the at least one charge, causes an approximately zero net charge to be delivered to the first electrode within the specified time period.

32. The apparatus of claim 31 wherein the charge zeroing means includes bias power supply means for delivering a bias current for a zeroing period, wherein the bias current and the zeroing period define said zeroing charge.

33. The apparatus of claim 31 wherein the charge zeroing means includes a passive circuit means having a transconductance function G(s) wherein s is a generalized frequency, and wherein G(O) is approximately 0.

34. The apparatus of claim 33 wherein the charge zeroing means includes pulse forming network means for being charged by said current generator in response to a switching device assuming an open state, and for being discharged in response to the switching device assuming a closed state, wherein said pulse forming network means is also for delivering said at least one charge when the pulse forming network means discharges and for delivering said zeroing charge when the pulse forming network means charges.

35. The apparatus of claim 33 wherein the charge zeroing means includes coupling capacitor means for charging with said at least one charge in response to the delivery to said first electrode of said at least one charge through the coupling capacitor means, and discharge element means for delivering said zeroing charge to said first electrode by discharging said at least one charge from the coupling capacitor means.

36. The apparatus of claim 33 wherein the charge zeroing means includes shunt inductor means for generating an expanding magnetic field in response to said delivery to said first electrode of said at least one charge, and for generating said zeroing charge in response to the collapsing of the magnetic field.

37. The apparatus of claim 33 wherein the charge zeroing means includes pulse transformer means for causing expanding of a magnetic field in response to said delivery to said first electrode of said at least one charge, and for generating said zeroing charge in response to collapsing of the magnetic field.

38. The apparatus of claim 31 wherein said current generator causes said delivery to said first electrode of said of least one current pulse during said specified time period, and said at least one current pulse causes said electrical double layer at said first electrode to charge to said prescribed voltage, said prescribed voltage not exceeding said reaction voltage of said prescribed reacting material species.

39. The apparatus of claim 31 wherein said current generator causes said delivery to said first electrode of said of least one current pulse during said specified time period, said specified time period being defined by $$\tau < \frac{C_d V_R \rho}{E}$$

wherein $\tau$ is said specified time period; $\rho$ is electrical resistivity of said food product; E is electric field strength of an electrical field caused by said at least one current pulse; $C_d$ is a first capacitance per unit area of said first electrical double layer in series with a second capacitance per unit area of a second electrical double layer, said second electrical double layer being at a second electrode; and $V_R$ is said reaction voltage for said prescribed reacting material species.

40. A method of deactivating organisms in a food product including:
(a) contacting the food product with a first electrode;
(b) applying a current signal to the first electrode during a specified time period, the current signal causing a deactivating charge to build up on the first electrode, an electrical field resulting from the deactivating charge having an electric field strength of at least 5,000 volts/cm, passing through the food product, and deactivating the organisms; and
(c) removing substantially all of a residual charge from the first electrode during a discharge period, the residual charge remaining on the first electrode following the specified time period, whereby an approximately zero net charge is delivered to the first electrode following the discharge period.

41. The method of claim 40 including:
(d) repeating steps (b) and (c).

42. The method of claim 40 wherein step (b) includes applying said current signal to said first electrode for said specified period of time, said current signal causing an electrical double layer at said first electrode to charge to a prescribed voltage, said prescribed voltage not exceeding a reaction voltage of a prescribed reacting material species within said food product for more than a prescribed threshold period.

43. The method of claim 40 wherein step (b) includes applying said current signal to said first electrode for said specified period of time, said current signal causing a first electrical double layer at said first electrode to charge to a prescribed voltage, said prescribed voltage not exceeding a reaction voltage of a prescribed reacting material species within said food product, thereby substantially preventing electrochemical reaction of the prescribed reacting material species within said food product.

44. The method of claim 43 wherein step (b) includes applying said current signal to said first electrode for said specified period of time, said specified period of time being defined by $$\tau < \frac{C_d V_R \rho}{E}$$

wherein $\tau$ is said specified period of time; $\rho$ is electrical resistivity of said food product; E is electric field strength of said electrical field; $C_d$ is a first capacitance per unit area of said first electrical double layer in series with a second capacitance per unit area of a second electrical double layer, said second electrical double layer being at a second electrode; and $V_R$ is said reaction voltage for said prescribed reacting material species.

45. A method of deactivating organisms in a food product including:
(a) contacting the food product with a first electrode;
(b) applying a current signal to the first electrode during a specified time period, the current signal causing a deactivating charge to build up on the first electrode, an electrical field resulting from the deactivating charge passing through the food product and deactivating the organisms, the current signal causing an electrical double layer at the first electrode to charge to a prescribed voltage not exceeding a reaction voltage of a prescribed reacting material species within the food product for more than a prescribed threshold period; and
(c) removing substantially all of a residual charge from the first electrode during a discharge period, the residual charge remaining on the first electrode following the specified time period, whereby an approximately zero net charge is delivered to the first electrode following the discharge period.

46. The method of claim 45 including:
(d) repeating steps (b) and (c).

47. The method of claim 45 wherein step (b) includes applying said current signal to said first electrode for said specified period of time, said current signal causing said electrical double layer at said first electrode to charge to said prescribed voltage, said prescribed voltage not exceeding said reaction voltage of said prescribed reacting material species within said food product, thereby preventing substantially electrochemical reaction of said prescribed reacting material species within said food product.

48. The method of claim 47 wherein step (b) includes applying said current signal to said first electrode for said specified period of time, said specified period of time being defined by $$\tau < \frac{C_d V_R \rho}{E}$$

wherein $\tau$ is said specified period of time; $\rho$ is electrical resistivity of said food product; E is electric field strength of said electrical field; $C_d$ is a first capacitance per unit area of said first electrical double layer in series with a second capacitance per unit area of a second electrical double layer, said second electrical double layer being at a second electrode; and $V_R$ is said reaction voltage for said prescribed reacting material species.

* * * * *

UNITED STATES PATENT AND TRADEMARK OFFICE
CERTIFICATE OF CORRECTION

PATENT NO. : 5,447,733
DATED : Sep. 5, 1995
INVENTOR(S) : BUSHNELL, et al.

It is certified that error appears in the above-indentified patent and that said Letters Patent is hereby corrected as shown below:

IN THE CLAIMS:
Column 28 (claim 38),
line 17, change "of said of" to --of said at--; Column 28 (claim 39), line 26, change "of said of" to --of said at--.

Signed and Sealed this

Thirtieth Day of January, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,447,733
DATED : September 5, 1995
INVENTOR(S) : Bushnell, et al.

It is certified that error appears in the above-indentified patent and that said Letters Patent is hereby corrected as shown below:

IN THE CLAIMS: Column 27 (claim 30), line 5, after the first occurrence of "prescribed" insert --period--.

Signed and Sealed this

Twenty-first Day of May, 1996

Attest:

BRUCE LEHMAN

Attesting Officer    Commissioner of Patents and Trademarks